March 10, 1964     A. A. AYKANIAN     3,123,854
APPARATUS FOR BIAXIAL STRETCHING OF THERMOPLASTIC FILM
Filed Dec. 23, 1960     3 Sheets-Sheet 1
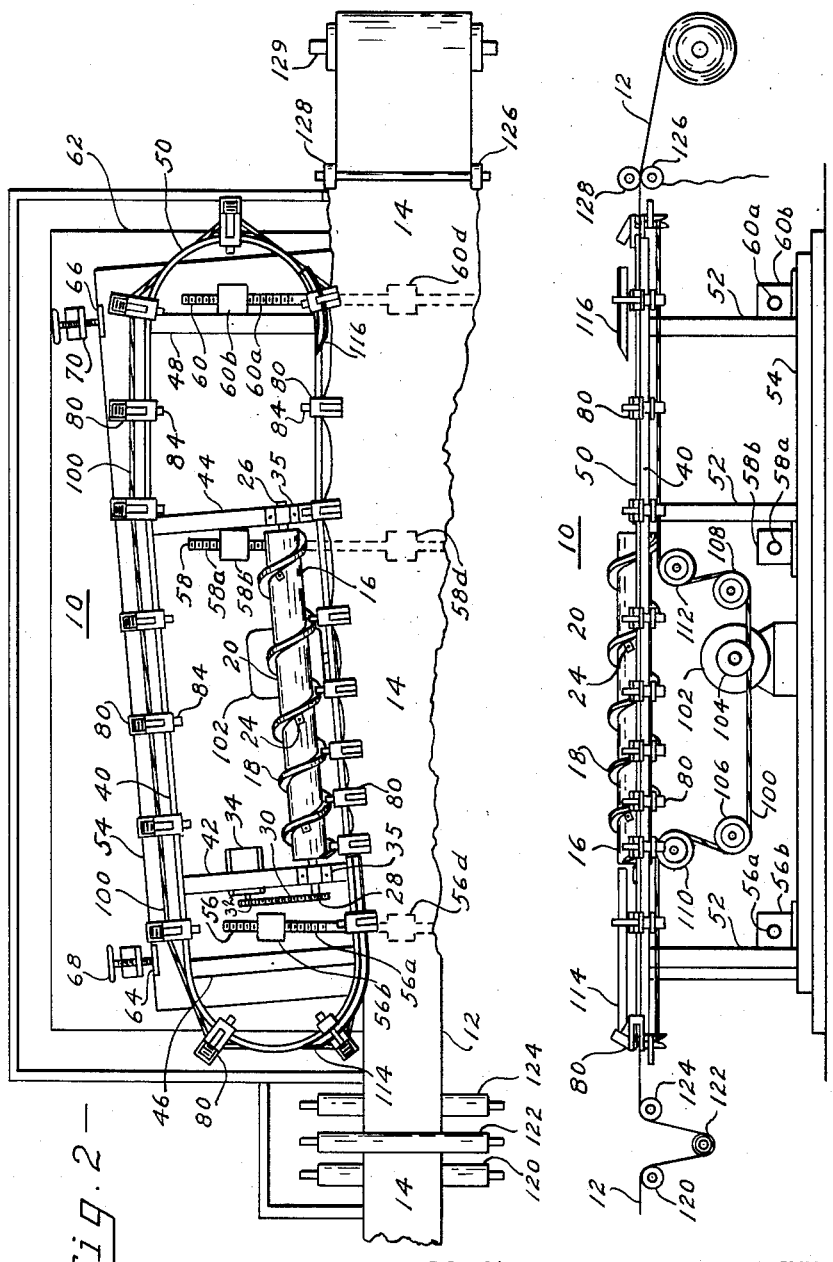
ARDASHUS A. AYKANIAN    INVENTOR.
BY *Cornelius F. Cleary*
ATTORNEY.

March 10, 1964     A. A. AYKANIAN     3,123,854
APPARATUS FOR BIAXIAL STRETCHING OF THERMOPLASTIC FILM
Filed Dec. 23, 1960     3 Sheets-Sheet 2
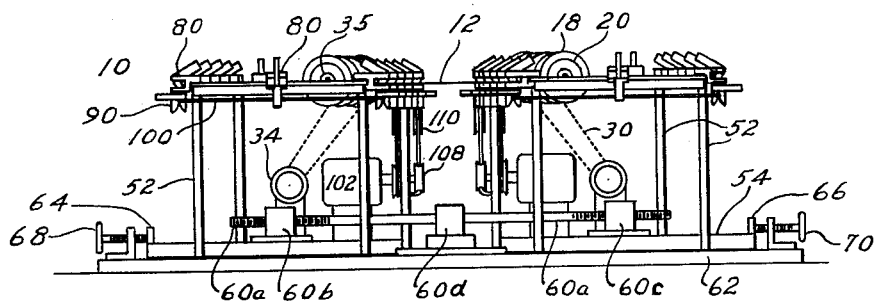
_Fig. 3 -_
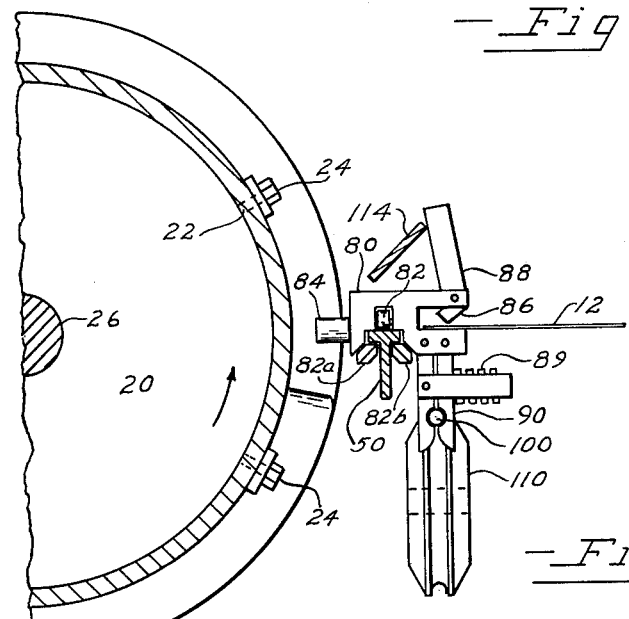
_Fig. 4 -_
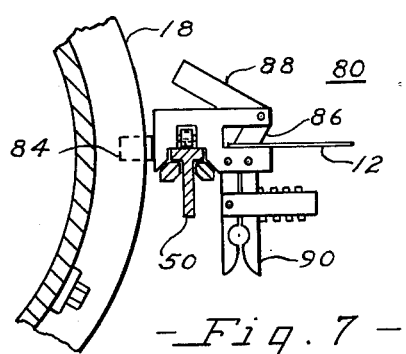
_Fig. 7 -_
ARDASHUS A. AYKANIAN    INVENTOR.
BY Cornelius H. Cleary
ATTORNEY.

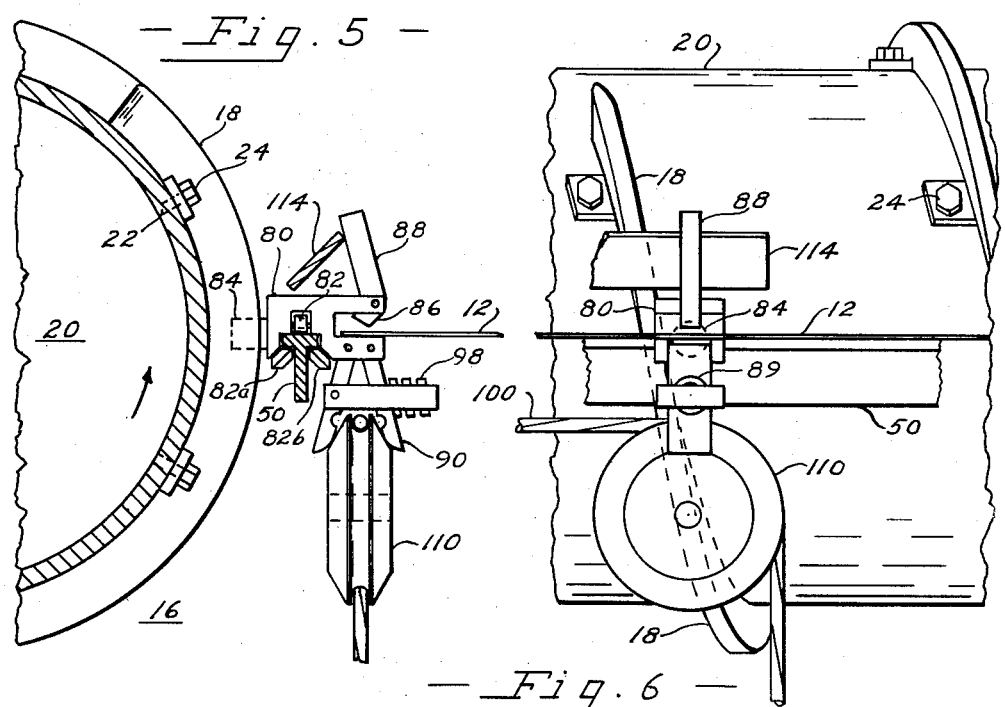
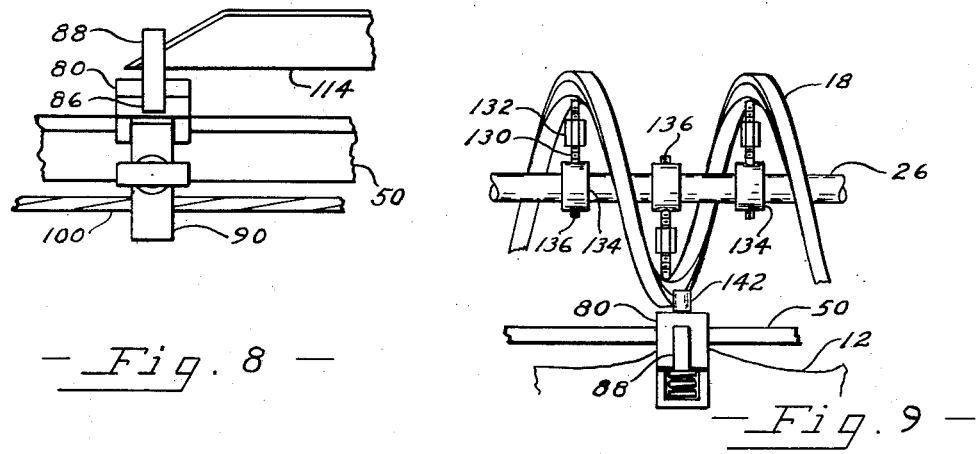
ARDASHUS A. AYKANIAN INVENTOR.
BY *Cornelius H. Cleary*
ATTORNEY.

United States Patent Office 3,123,854
Patented Mar. 10, 1964

3,123,854
APPARATUS FOR BIAXIAL STRETCHING OF THERMOPLASTIC FILM
Ardashus A. Aykanian, Wilbraham, Mass., assignor to Monsanto Chemical Company, St. Louis, Mo., a corporation of Delaware
Filed Dec. 23, 1960, Ser. No. 78,010
6 Claims. (Cl. 18—1)

The present invention is directed to introducing biaxial stretch orientation into thermoplastic planar members and more particularly to apparatus with which to continuously and simultaneously introduce biaxial stretch orientation into such members.

It is presently appreciated that certain thermoplastic materials exhibit enhanced physical properties, particularly flexibility, optical clarity, tensile and impact strength, as the result of being permanently stretch oriented. In the case of thermoplastic members having essentially linear configuration such as filaments, fibers and the like, having for practical purposes a single or longitudinal axis, introduction of stretch orientation is a comparatively simple matter in that it need only be introduced along this single axis. With respect to members of thermoplastic material having a planar configuration, such as sheets, films, etc., the situation becomes vastly more complex, for the reason that biaxial stretching is desired, that is stretch orientation is introduced along both a longitudinal and lateral axis.

In many instances, planar members of thermoplastic materials have been biaxially oriented through a sequential or step-wise operation, that is where stretching is introduced first along one axis and thereafter along the axis lateral to the first. In other cases, it has been found more desirable to have biaxial stretch orientation introduced along both axes simultaneously. The latter procedure has been found to contribute closer conformity of stretch orientation and physical properties throughout planar thermoplastic material. Additionally, using the simultaneous stretching procedure eliminates the possibility of contraction or return to normal along the axis first oriented while stretch orientation is being carried out along the second or lateral axis, as is prone to happen during practice of the sequential-type stretching.

Difficulties of an engineering nature have been met in designing apparatus capable of providing simultaneous biaxial stretch orientation in planar members of thermoplastic material. These problems become magnified when the design is that of providing apparatus capable of introducing simultaneous biaxial stretch orientation in a continuous manner into a planar member of thermoplastic material. For the most part, the apparatuses which have been designed to date for continuous simultaneous stretching of thermoplastic members, because of structural requirements necessary to provide sufficient tensions in the films to stretch the same, have sacrificed operational flexibility. Once in operation, they do not lend themselves to adjustment. Consequently, in order to compensate for variations in film width, etc., they must be shut down while adjustments are being carried out.

Accordingly, it a principal object of the present invention to provide stretching apparatus capable of continuously and simultaneously introducing biaxial stretch orientation into planar members of thermoplastic material.

Another object is to provide stretching apparatus capable of introducing predetermined amounts of stretch orientation continuously and simultaneously along the longitudinal and lateral axes of planar members of thermoplastic material.

Another object is to provide stretching apparatus capable of continuously and simultaneously introducing predetermined amounts of biaxial stretch orientation into thermoplastic material, the apparatus being sufficiently flexible to allow changing of stretching rates and amounts during operation of the same.

Other objects of the invention will in part be obvious and will in part appear hereinafter.

The objects of the present invention can be attained by biaxially stretch orienting a thermoplastic material member of planar configuration, e.g., film sheet, etc., in stretching apparatus comprising a pair of stretching means located in at least partially pivotable substantially planar spaced relationship to one another and wherein the said stretching means comprise helical members capable at least in part of variable pitch, the said helical members being axially disposed to effect a planar angular divergence from the normal longitudinal axis of said stretching apparatus, said divergence being in the direction away from the initiating end of said stretching apparatus, and provided in coactive relationship with each of said helical members, a plurality of thermoplastic member grippers at least some of which are in slidable captive relationship with said helical member, and tracking for stabilizing the member grippers with relation to said helical member during advance of the same.

For a fuller understanding of the nature and objects of the invention, reference should be had to the following detailed description taken in connection with the accompanying drawings, in which:

FIGURE 1 is an elevational side view diagrammatically illustrating one embodiment of the biaxial stretching apparatus of the present invention.

FIGURE 2 is a partial top plan view with parts broken diagrammatically illustrating the same embodiment of the present invention as shown on the previous figure.

FIGURE 3 is an elevational front view of the same embodiment illustrated in the two previous figures.

FIGURE 4 is a fragmentary front elevation partly in section showing a member gripper positioned at the initiating end of said stretching apparatus prior to take-up by the helix.

FIGURE 5 is the same view as FIGURE 4 except that the member gripper has advanced to a point where disengagement of the said gripper from the cable has just taken place.

FIGURE 6 is a fragmentary side elevation partly in section otherwise corresponding to FIGURE 5.

FIGURE 7 is a fragmentary front elevation partly in section showing a member gripper in position immediately following pickup by the helix.

FIGURE 8 is a fragmentary front elevation partly in section showing the cam action in opening the gripper jaws priors to introduction of the thermoplastic member into the same.

FIGURE 9 is a fragmentary top plan partly in section illustrating a separate embodiment of a helical member which can be used in the stretching apparatus of this invention.

Turning to the drawings in which like numbers refer to like parts throughout FIGURES 1–3 generally illustrate stretching apparatus 10, constituting an embodiment of the present invention, carrying a thermoplastic member 12 of planar configuration, i.e., sheet or film form, into which biaxial stretch orientation is being simultaneously introduced. The normal longitudinal axis 14, see particularly FIGURE 2, of thermoplastic material 12 is in substantial coaxial alignment with the longitudinal axis of apparatus 10, and can be further defined as lying intermediate of the two stretching means 16—16.

Each stretching means 16 is located in partially pivotable planar spaced relationship with respect to its counterpart.

Each stretching means 16 constitute a helical member or helical ribbon 18 which as shown circumscribes cylinder or drum 20. A number of taps 22—22, see FIGS. 4–7, are provided in drum 20, into which lugs 24—24 are screwed. These serve to secure the helical ribbon 18 to drum 20. An excess number of taps 22—22 are provided in order to accommodate varying the pitch of helical ribbon 18. Each drum 20, has an integrated central shaft 26. Chain sprocket 28 headed onto shaft 26 is coordinated through chain 30 to take off chain sprocket 32, which is in turn driven by variable speed motor 34. In this manner, rotation is provided to helical member 18.

Each stretching means 16 is secured by means of pillow blocks 35—35 to frame generally 40 and specifically to top lateral frame members 42 and 44 respectively. Two other top frame members 46 and 48 are located at the initiating and discharge ends, respectively, of frame 40. The top periphery of frame 40 is defined by tracking 50.

Vertical and horizontal positioning of a stretching means 16, and readjustment of this positioning, is dependent upon frame 40. Vertical positioning is provided through upright frame members 52, 52 which are secured to and support in elevation tracking 50. Each frame member 52 is in turn securely stationed onto bottom frame member 54. Uprights 52, 52 can be made elevationally adjustable if so desired. Braces can be provided to lend further support and stability to the said frame. Horizontal positioning, and first, that of a lateral nature is provided for by means of a number of lateral dividers 56, 58 and 60 constituting in turn a number of double action screws 56a, 58a and 60a, each screw coacting with two counterpart followers 56b and 56c, 58b and 58c and 60b and 60c, respectively with 56c and 58c not shown. Each of the counterpart followers are secured to an individual frame 40. Thus, followers 56c, 58c and 60c are secured to a single frame 40 while followers 56b, 58b and 60b will be secured to counterpart frame 40. Each of screws 56a, 58a and 60a are activated through double action central drives 56d, 58d and 60d respectively, and prime movers, not shown, lateral divergence between stretching means 16 and 16, both general and, that which is pivotal and provides as a result the prescribed angular divergence which takes place, away from the normal longitudinal axis 14 and in the direction away from the initiating end of the stretching apparatus 10, is accommodated by the said dividers and settings carried out through the same. Adaptation of horizontal positioning of a longitudinal-type is accommodated through the expedient of positioning slideably stationary frame 40, and more specifically the bottom frame member 54 of the said frame, on base member 62. Base member 62 having a greater effective length than bottom frame members 54 is provided at the ends thereof with flanges 64 and 66 having longitudinal positioning screws 68 and 70 tapped through the same.

As indicated previously, the top periphery of frame 40 is shown constituting a continuous tracking 50. Tracking 50 is also shown in plan as elliptical in outline. Other plans can also be accommodated as for instance a circular configuration. Under any condition, tracking 50 more or less circumscribes helical member 18 and should substantially parallel the axes of the said member 18 at the inboard side of member 18 and intermediate of the said member 18 and film 12. Tracking 50 is shown having a T-shaped cross-sectional configuration or profile, see in particular FIGS. 4 and 7, however, tracking having other profiles can also be used. In order to contribute flexibility to tracking 50, a number of flexible joints, not specifically shown, can be provided in the same. This is a particularly desirable expedient to have present when tapering off stretch orientation is desired, as, when the thermoplastic member 12 leaves the discharge end of helical member 16 and is maintained under tension, without further stretching, and is cooled or subjected to other after-treatment.

A plurality of thermoplastic member or sheet grippers which can also be referred to as tenter clips, 80—80 are located in slideable captive engagement on tracking 50.

Coaction of sheet grippers 80—80 with the various other components of stretching apparatus can be effected in a manner illustrated in detail in FIGS. 4–7. Initially, slideable captive engagement on tracking 50 is facilitated by stabilizing rollers 82, 82a and 82b which are positioned to the underneath part of each of said gripper 80—80. Coaction between grippers 80—80 and helix 18, which with rotation of the latter effects advance of the said grippers from the initiation end through the discharge end of the said helix 18 is facilitated by a roller 84 provided to the inner side of each said gripper 80. During advance of a gripper 80 along helix 18 the said gripper 80 is designed to hold the marginal edges of sheet 12 securely so that with divergence, both lateral and longitudinal provided by the said helixes 18—18 can be transmitted to the said sheet 12 and result in lateral stretch orientation commensurate with the same being initiated in the said sheet. For this purpose, each said gripper 80 is provided with jawed profile 86 through which a pivotable jaw member 88 projects.

The bottom of each of said grippers 80 is provided with spring 89 loaded cable clamp 90 for the purpose of transferring grippers 80—80 from the discharge end of helix 18 back to the initiation end for re-routing through the same, a drive cable 100 is used. Drive is activated by variable speed motor 102 through take-off pulley 104, idler pulleys 106 and 108 and sheave pulleys 110 and 112. The sheave pulleys 110 and 112 define the path of cable 100 in such a manner that its proximity to grippers 80—80 is removed immediate to helix 16. Additionally, the sheaves are located at either end of the helix 16 in such a manner as to act as opening cams with which to open cable clamps 90. Specifically, disengagement of each said gripper at the initiating end of helix 16, results from the cam action provided by re-engagement at the discharge end of the helix 16 results from similar action of sheave pulley 112.

FIGS. 4–7 taken in sequence show the manner in which sheet grippers 80—80 are designed to coact first with cable 100 and then with helix 16, the latter being paralleled after gripping of the marginal edge of film 12 has been executed by the said grippers. FIG. 4 shows gripper 80 in a position at the initiation end of stretching means 16 and previous to its being taken up by helix 18. At this point cable 100 is still engaged by and provides advance to the said gripper. Also, jaw 86 is open with the margin edge of film 12 resting within the same. FIGS. 5 and 6 illustrate gripper 80 in slightly advanced position relative to the preceding, but taken up by helix 18, and with jaw 86 still being retained open. Gripper 80 has, however, advanced to where it rides over sheave 110, which latter provides a cam-like action serving to open cable clamp 90 and release cable 100. In FIG. 7, gripper 80 has been taken up by helix 18, and advance to the said gripper is now provided by helix 18. Coincidentally, jaw 86 is closed, securing the marginal edge of film 12 within the same. When gripper 80 arrives at the discharge end of helix 18, the above steps are substantially reversed, that is disengagement of the grippers 80 from helix 18 takes place, and counterpart sheave 112 serves to open cable clamp 90 on passing over sheave 112, then clamps cable 100 which then takes over, and advances gripper 90 around and back to the initiation end of helix 18. Note, however, that the jaw 86 of gripper 90 is not opened immediately of discharge. In considering the preceding, figures and the steps illustrated by the same, a pair of canted opening cams 114 and 116 located at the initiation and discharge ends of stretching means 16, respectively, automatically open the jaws of grippers 80—80. This aspect is shown in further detail in FIG. 8.

FIGURES 1 and 2 show certain of the ancillary features of stretching apparatus 10. In general, it is located within a heated section in order to provide the film 12 under a temperature favorable to carrying out of the desired stretch orientation. Rearwardly then is a cooling section where setting of orientation into film 12 is provided for. Both the heated and cooling sections can utilize circulated air maintained at proper temperatures. In order to introduce film 12 into the stretching apparatus 10, a bank of rollers 120, 122 and 124 are provided around which the said film is wrapped. Supports for the said rollers are not shown. Rearward again of the cooling section, a set of trim slitters 126 and 128 are provided through which the film is directed. Finally, an activated wind-up roll 129 is provided on which to collect the now biaxially oriented film 12. Means for activating wind-up roll 129 together with support for each of the same is not shown. It is also possible to drive wind-up roll and the drive cable by the same variable speed drive 34 as the stretching means 16.

FIGURE 9 illustrates a separate embodiment of a helical member 16 which can be used in practice of the present invention. Here, the helical ribbon 18 is of the open-type. Helical stretchers 130, 130 serve to integrate helical member 18 with center shaft 26. In order to vary the radius of helix 18 an adjustable double tapped collar 132 is located intermediate of the stretchers 130, 130. The pitch of helical ribbon 18 can be adjusted through the axial location of the said stretcher 132 relative to shaft 26. This is facilitated by providing annular collars 134 at the interior end of the said stretchers, which circumscribe shaft 26. A set screw 136 is tapped through each collar 134 to contact shaft 26 in order to secure the pitch so set. In the same embodiment gripper 80 is provided with roller 142 with which to facilitate advance of the said gripper on take-up by the helix 18.

*Operation*

In anticipation of carrying out simultaneous stretch orientation of a thermoplastic member 12 on stretching apparatus 10, the said apparatus is pre-positioned relative to location and elevation, followed by pivotal adjustment of helixes 16—16 in planar relationship to one another to provide the desired angle of divergence.

The pitch of each of helical ribbons 18—18 can be set in a manner anticipating the desired lateral and longitudinal stretch orientation to be instituted in thermoplastic material 12. Preferably, the pitches are set to provide for the introduction of increments of orientation continuously along a major part of helical ribbons 18—18, using the expedients already described. Consideration of orientation or stretching is in lateral and longitudinal relationship to stretching means 10. Particular circumstances may involve adjusting and most probably increasing the pitch of the individual turns of helical ribbons 18—18 in the direction of advance of thermoplastic member 12.

The first full turn of each helical ribbon 18 is preferably adjusted to maintain a substantially constant pitch and in this manner provide a constant axial distance. This is done to insure continuous uniform initial engagement of the lateral margins of thermoplastic material 12 with individual sheet grippers 80—80. As a result, a constant helical angle is maintained throughout the first turn of helical ribbon 18. The same arrangement can be had with respect to the final full turn or terminal end of helical ribbon 18. The remainder or intermediate portion of helical ribbon 18 is axially adjusted, in the direction of advance of said material 12 so that the individual turns will have a desired axial relationship or distance relative to one another. The occasion for utilization of the invention will dictate final adjustment of the pitch of the individual turns of helical ribbon 18. In operation, the lateral margins of thermoplastic material 12 are secured by grip jaws 86—86 located in member grippers 80—80, the same being positioned at the time of start up at the initiation end of helixes 16—16. Advance of grippers 80—80 in which thermoplastic material 12 is marginally secured, along helixes 16—16 is obtained by rotating the said helixes 20—20. During advancement along helixes 16—16, member grippers 80—80 are stabilized by coaction of a slidable nature with tracking 50. After the individual sheet grippers 80—80 have traveled the length of a helix 20, they are engaged by cable 100 again coacting with tracking 50. In this manner member grippers 80—80 are recircuited to the initiating ends of each of helixes 16—16.

While thermoplastic material 12 is being stretch oriented in stretching apparatus 10, temperature may well be of concern. This can be facilitated by locating the subject stretching apparatus within an oven or heated zone. Choice of temperature will vary depending upon the composition of the thermoplastic material, considered in conjunction with the amount and speed of stretching desired. For instance, in the orientation of atactic polystyrene sheet, a temperature range of 230–270° F. is recommended as optimum under which to introduce orientation or stretching to the extent of 2.5–3.5 times normal. However, in general, it can be said that orientation is carried out at or above the glass transition temperature $T_{(g)}$ for the thermoplastic member being stretch oriented. This temperature is that temperature, which on being advanced through in ascendancy, the thermoplastic material changes from a glassy to a rubbery consistency.

When providing orientation in noncrystalline materials which include polystyrene (atactic), methyl methacrylate, acylates, polyvinyl chloride and others $T_{(g)}$ is usually the determining temperature of operation. In the case of some thermoplastic materials, particularly crystalline-type thermoplastic materials where contemplated future fabrication so dictates, it may be preferable to carry the orientation out at, or above the crystalline melting temperature, $T_{(m)}$ which is again above the glassy transition temperature $T_{(g)}$. Crystalline thermoplastic materials include nylon, polyethylene, polypropylene, polyvinyl fluoride, crystalline polystyrene (isotactic) and others.

The present invention can be used in conjunction with other expedients with which to facilitate stretch orientation and the retention of same. In particular, lateral pinch rolls can be positioned at the initiation and discharge ends of the apparatus, as well as cooling means adapted to cool the sheet gripping means. In addition, it may be desirable to include quenching means, or cooling section as it has been shown and previously described, which is located rearward of the actual stretching means, and into which the thermoplastic material is led after completion of the stretch orientation herein disclosed. Utilization of quenching or cooling is designed to insure retention of the stretch orientation after introduction of the same. Quenching of the member or sheet is preferably done immediately after orientation and while tension is maintained in the same.

The present invention is adapted for utilization broadly with thermoplastic planar members preferably those in sheet or film form. By the term sheet, it is intended to include materials having the configuration ordinarily so described as well as ribbons, tubes, and these can be in single or multiple ply.

It will thus be seen that the objects set forth above, including those made apparent from the preceding description, are efficiently attained, and, since certain changes may be made in carrying out the above process and constructions set forth without departing from the scope of the invention, it is intended that all material contained in the above description and shown in the accompanying drawings shall be interpreted as illustrative and not in a limiting sense.

What is claimed is:

1. Stretching apparatus for continuously introducing biaxial stretch orientation into a thermoplastic material member of planar configuration which comprises in combination a pair of stretching means located in at least partially pivoted substantially planar spaced relationship to one another, and wherein each of the said stretching means comprises a helical member, capable at least in part of variable pitch, the helical members being axially disposed to effect a planar angular divergence from the normal longitudinal axis of said stretching apparatus, said divergence being in the direction away from the initiating end of said stretching apparatus, and a plurality of thermoplastic member grippers at least some of which are in slideable captive relationship with said helical member, a drive cable adapted to disengage and engage said member grippers at the initiation and discharge ends respectively of said helical member, said cable being driven along a path such that the thermoplastic member grippers are being continuously returned to said helical member, tracking for stabilizing said member grippers with relation to said helical member during advance of the same, and actuating means for rotating said helical member provided in coactive relationship with each of said helical members.

2. The stretching apparatus according to claim 1 wherein at least the first full turn of the helical member is maintained at a substantially constant pitch.

3. The stretching apparatus according to claim 1 wherein the helical member is capable of predetermined variable pitch, comprising an open helix in conjunction with a longitudinally extending shaft located to the interior of said helix and radial stretchers in juxtaposition therebetween, said stretchers adapted for radial and longitudinal adjustment with relation to said shaft.

4. The stretching apparatus according to claim 3 wherein each of the thermoplastic member grippers are provided with stabilizing rollers positioned on the underpart of said grippers and a roller positioned on the inner side of said grippers for coaction with said helix.

5. The stretching apparatus according to claim 4 wherein each of said grippers are provided with a spring loaded cable clamp adapted to release and grip a cable.

6. The stretching apparatus according to claim 1 wherein cams are provided at the initiation and discharge ends of said helical member for continuously opening spring loaded sheet gripper jaws located in said sheet grippers.

References Cited in the file of this patent

UNITED STATES PATENTS

| | | |
|---|---|---|
| 455,384 | Birkholz | July 7, 1891 |
| 887,762 | Brent | May 19, 1908 |
| 3,014,234 | Koppehele | Dec. 26, 1961 |

FOREIGN PATENTS

| | | |
|---|---|---|
| 1,088,703 | Germany | Sept. 8, 1960 |